(12) United States Patent
Cui et al.

(10) Patent No.: US 10,443,112 B2
(45) Date of Patent: Oct. 15, 2019

(54) FUMING FURNACE WITH LEAD COLLECTING AND DISCHARGING FUNCTION

(71) Applicant: CHINA ENFI ENGINEERING CORPORATION, Beijing (CN)

(72) Inventors: Dawei Cui, Beijing (CN); Kefei Cao, Beijing (CN); Chuangu Wu, Beijing (CN); Shuangjie Feng, Beijing (CN); Xin Xu, Beijing (CN); Zhenmin Zhang, Beijing (CN)

(73) Assignee: CHINA ENFI ENGINEERING CORPORATION, Beijing (CN)

( * ) Notice: Subject to any disclaimer, the term of this patent is extended or adjusted under 35 U.S.C. 154(b) by 258 days.

(21) Appl. No.: 15/512,211

(22) PCT Filed: Sep. 15, 2015

(86) PCT No.: PCT/CN2015/089618
§ 371 (c)(1),
(2) Date: Mar. 17, 2017

(87) PCT Pub. No.: WO2016/045522
PCT Pub. Date: Mar. 31, 2016

(65) Prior Publication Data
US 2017/0283907 A1    Oct. 5, 2017

(30) Foreign Application Priority Data

Sep. 24, 2014 (CN) .......................... 2014 1 0494367
Sep. 24, 2014 (CN) .................... 2014 2 0554310 U

(51) Int. Cl.
C22B 13/02         (2006.01)
C22B 7/04          (2006.01)
(Continued)

(52) U.S. Cl.
CPC ................ $C22B\ 13/02$ (2013.01); $C22B\ 7/04$ (2013.01); $C22B\ 19/30$ (2013.01); $F27B\ 1/10$ (2013.01);
(Continued)

(58) Field of Classification Search
CPC ................................ C22B 13/02; C22B 19/30
See application file for complete search history.

(56) References Cited

U.S. PATENT DOCUMENTS 3,990,889 A * 11/1976 Queneau ................... C22B 5/00
                                                             75/627
4,294,433 A * 10/1981 Vanjukov .................. F27B 1/10
                                                            266/161
2017/0283907 A1* 10/2017 Cui .......................... C22B 7/04

FOREIGN PATENT DOCUMENTS

CN         201400711 Y      2/2010
CN         202279848 U      6/2012
(Continued)

*Primary Examiner* — Scott R Kastler
(74) *Attorney, Agent, or Firm* — Hodgson Russ LLP

(57) ABSTRACT

Disclosed is a fuming furnace with a lead collecting and discharging function, the fuming furnace comprising a furnace body; the furnace body is provided with a hearth therein and a tuyere thereon; the bottom of the hearth forms a molten pool; the furnace body is further provided with a slag discharging outlet and a lead discharging outlet thereon; the furnace body comprises a furnace bottom water jacket and a hearth water jacket; the furnace bottom water jacket is provided with a refractory brick layer at the inner wall thereof; the refractory brick layer is provided with a lead collecting and discharging channel therein for collecting and discharging lead; the lead collecting and discharging channel is in communication with the lead discharging outlet, and the lead collecting and discharging channel is in communication with the molten pool via joints between the refractory bricks forming the refractory brick layer.

16 Claims, 2 Drawing Sheets

(51) Int. Cl.
*C22B 19/30* (2006.01)
*F27B 1/10* (2006.01)
*F27B 3/02* (2006.01)
*F27B 3/10* (2006.01)

(52) U.S. Cl.
CPC .................. *F27B 3/02* (2013.01); *F27B 3/10* (2013.01); *Y02P 10/212* (2015.11)

(56) References Cited

FOREIGN PATENT DOCUMENTS

| | | |
|---|---|---|
| CN | 104263953 A | 1/2015 |
| CN | 204211788 U | 3/2015 |
| GB | 976155 A | 11/1964 |

* cited by examiner

FUMING FURNACE WITH LEAD COLLECTING AND DISCHARGING FUNCTION

CROSS-REFERENCE TO RELATED APPLICATION

The present application is a national phase entry under 35 USC § 371 of International Application PCT/CN2015/089618, filed Sep. 15, 2015, which claims the benefits of and priority to Chinese Patent Application No. 201410494367.3, filed Sep. 24, 2014, and Chinese Patent Application No. 201420554310.3, filed Sep. 24, 2014, the entire disclosures of which are incorporated herein by reference.

FIELD

The present disclosure relates to a field of non-ferrous metal smelting, and more particularly to a fuming furnace with lead collecting and discharging function.

BACKGROUND

A fuming furnace is a common non-ferrous smelting device which is used for treating slag when smelting lead and zinc. When the fuming furnace of the related art is used for treating leaded materials, the lead will be deposited at the bottom of a molten pool in the furnace if the lead content is too high. The deposited lead causes damage to the furnace (furnace bottom water jacket and furnace wall water jacket), which leads to a water seepage or even an explosion in severe cases, thereby there existing requirements for improvements. At the same time, the improvements will also enhance the treating ability and adaptability of the fuming furnace to the leaded materials with high lead content.

SUMMARY

The present application is made based on inventors' discoveries and understandings with respect to the following facts and questions: materials treated by a fuming furnace of the related art have a low lead content, for example, which is generally not higher than 7-8%. In this way, most lead is discharged in a form of vapor, and very little lead may collect at the bottom of a molten pool in a furnace body. If the lead content of the materials is too high, for example when the lead content is 8-15%, it will result in the lead being deposited at the bottom of the molten pool in the furnace. With respect to the traditional fuming furnace, the deposited lead continuously accumulates at the bottom of the furnace and is hard to discharge effectively in time, thereby damaging the furnace and resulting in a safety accident.

Inventors of the present application further recognize that, even if a lead discharging outlet is disposed on the wall of the furnace, the fuming furnace needs to operate discontinuously so as to discharge the lead regularly and cannot operate continuously in the long term, thereby reducing the production efficiency. Moreover, due to stirring of the molten pool in the furnace by a tuyere (or spray gun) of the fuming furnace, a stable lead layer is hard to form at the bottom of the molten pool, the lead cannot be discharged effectively. In addition, as being easy to exist in the joints between refractory bricks at the bottom of the furnace, the lead at the bottom of the molten pool cannot be discharged by a manner of drilling.

Embodiments of the present disclosure seek to solve at least one of the problems existing in the related art to at least some extent. To this end, a fuming furnace with a lead collecting and discharging function is provided by the present disclosure.

The fuming furnace with the lead collecting and discharging function according to embodiments of the present disclosure includes a furnace body, in which the furnace body is provided with a hearth therein and a tuyere thereon, the hearth has a bottom forming a molten pool, the furnace body is provided with a slag discharging outlet and a lead discharging outlet, the furnace body includes a furnace bottom water jacket and a hearth water jacket, the furnace bottom water jacket has an inner wall provided with a refractory brick layer, the refractory brick layer is provided with a lead collecting and discharging channel configured to collect and discharge lead therein, the lead collecting and discharging channel is in communication with the lead discharging outlet, and the lead collecting and discharging channel is in communication with the molten pool through joints between refractory bricks forming the refractory brick layer.

The fuming furnace with the lead collecting and discharging function according to embodiments of the present disclosure has advantages of a high security, a high producing efficiency, a wide scope of application and a long service life.

In addition, the fuming furnace with the lead collecting and discharging function according to embodiments of the present disclosure may also have the following additional technical features.

According to an embodiment of the present disclosure, the lead discharging outlet is disposed at a lower portion of an end wall of the furnace body.

According to an embodiment of the present disclosure, the lead collecting and discharging channel includes a main channel and a branch channel, in which one end of the main channel is in communication with the lead discharging outlet and one end of the branch channel is in communication with the main channel, and the other end of the main channel and the other end of the branch channel are closed According to an embodiment of the present disclosure, the lead collecting and discharging channel includes a linear main channel and an annular or linear branch channel in communication with the main channel.

According to an embodiment of the present disclosure, one or two main channels are provided and one or more branch channels are provided.

DETAILED DESCRIPTION

Figure 1:
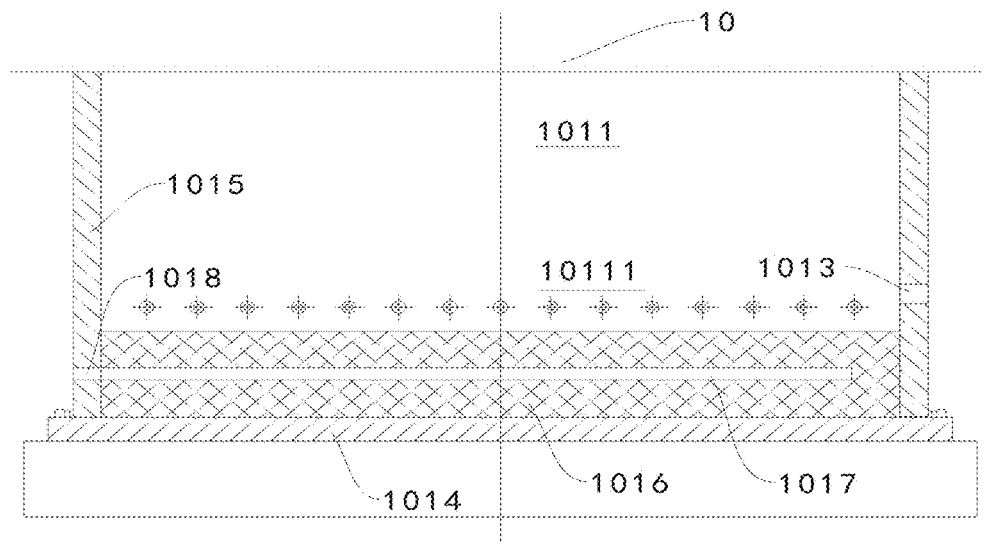
FIG. 1 is a longitudinally sectional view of a fuming furnace with a lead collecting and discharging function according to embodiments of the present disclosure.

Reference will be made in detail to embodiments of the present disclosure. The embodiments described herein with reference to drawings are explanatory, illustrative, and used to generally understand the present disclosure. The embodiments shall not be construed to limit the present disclosure.

A fuming furnace 10 with a lead collecting and discharging function according to embodiments of the present disclosure will be described with reference to drawings in the following. As shown in FIGS. 1-4, the fuming furnace 10 with the lead collecting and discharging function according to embodiments of the present disclosure includes a furnace body 101. The furnace body 101 is provided with a hearth 1011 therein and a tuyere 1012 thereon, A molten pool 10111 is disposed at the bottom of the hearth 1011. The furnace body 101 is provided with a slag discharging outlet 1013 and a lead discharging outlet 1018. The furnace body 101 includes a furnace bottom water jacket 1014 and a hearth water jacket 1015. An inner wall of the furnace bottom water jacket 1014 is provided with a refractory brick layer 1016. A lead collecting and discharging channel 1017 configured to collect and discharge lead is disposed in the refractory brick layer 1016. The lead collecting and discharging channel 1017 is in communication with the lead discharging outlet 1018 and the lead collecting and discharging channel 1017 is in communication with the molten pool 10111 through joints between refractory bricks forming the refractory brick layer 1016.

When using the fuming furnace 10 with the lead collecting and discharging function according to embodiments of the present disclosure to treat materials with high lead content, liquid lead exists in the molten pool 10111 and crude lead is deposited at the bottom of the molten pool 10111 and in the joints between the refractory bricks of the refractory brick layer 1016.

The fuming furnace 10 with the lead collecting and discharging function according to embodiments of the present disclosure is provided with the lead collecting and discharging channel 1017 in the refractory brick layer 1016, the crude lead deposited at the bottom of the molten pool 10111 and in the joints between the refractory bricks of the refractory brick layer 1016 can accumulate in the lead collecting and discharging channel 1017. At the time the crude lead still has liquidity to some extent, and may be discharged out of the fuming furnace 10 from the lead discharging outlet 1018, thus preventing the deposited lead from accumulating at the bottom of the molten pool 10111 which causes damage to the furnace body.

The fuming furnace 10 with the lead collecting and discharging function according to embodiments of the present disclosure can treat the materials with high lead content, thereby enlarging the scope of application of the fuming furnace 10. Moreover, the fuming furnace 10 with the lead collecting and discharging function according to embodiments of the present disclosure can discharge the deposited lead at the bottom of the furnace during continuous production without shutdown, thereby improving the producing efficiency of the fuming furnace 10.

Therefore, the fuming furnace 10 with the lead collecting and discharging function according to embodiments of the present disclosure has advantages of a high security, a high producing efficiency, a wide application scope and a long service life.

Figure 2:
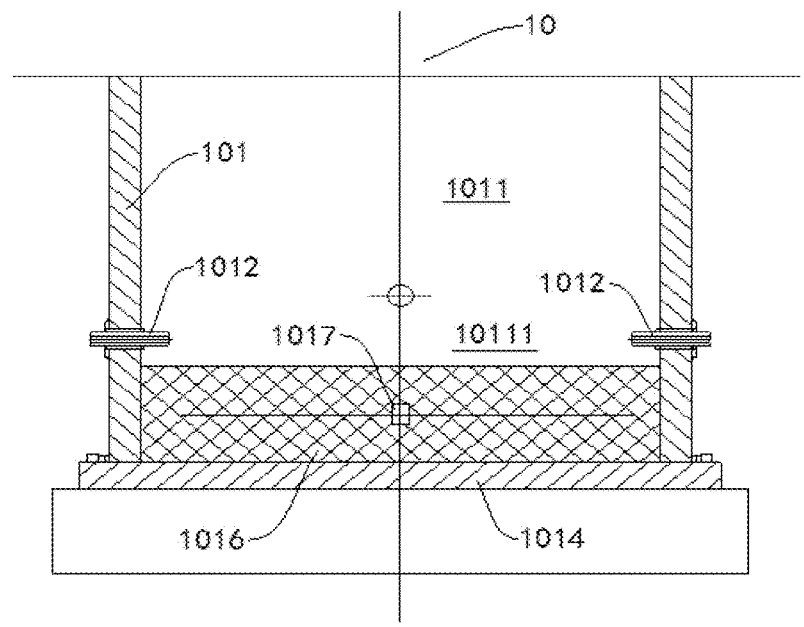
FIG. 2 is a laterally sectional view of a fuming furnace with a lead collecting and discharging function according to embodiments of the present disclosure.

As shown in FIG. 1 and FIG. 2, the fuming furnace 10 according to some embodiments of the present disclosure includes the furnace body 101 provided with the hearth 1011 therein. The bottom of the hearth 1011 forms the molten pool 10111. The furnace body 101 includes the furnace bottom water jacket 1014 and the hearth water jacket 1015. The inner wall of the furnace bottom water jacket 1014 is provided with the refractory brick layer 1016. The lead collecting and discharging channel 1017 configured to collect and discharge the lead is disposed in the refractory brick layer 1016. The lead collecting and discharging channel 1017 is in communication with the lead discharging outlet 1018 and the lead collecting and discharging channel 1017 is in communication with the molten pool 10111 through the joints between refractory bricks forming the refractory brick layer 1016. The lead collecting and discharging channel 1017 may collect and discharge the crude lead deposited in the molten pool 10111.

Advantageously, the lead discharging outlet 1018 may be disposed at a lower portion of an end wall of the furnace body 101. Specifically, the lead discharging outlet 1018 may be disposed at a lower portion of an end wall of the hearth water jacket 1015.

Figure 3:
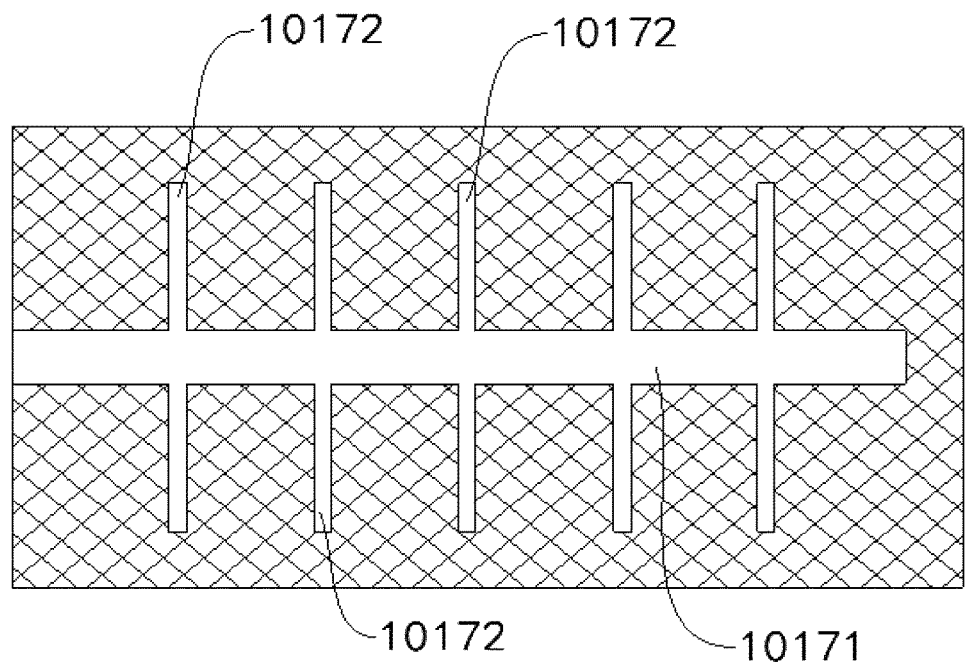
FIG. 3 is a schematic view of a lead collecting and discharging channel of a fuming furnace with a lead collecting and discharging function according to an embodiment of the present disclosure.

As shown in FIG. 3, in an embodiment of the present disclosure, the lead collecting and discharging channel 1017 includes a main channel 10171 and a branch channel 10172. One end of the main channel 10171 is in communication with the lead discharging outlet 1018 and one end of the branch channel 10172 is in communication with the main channel 10171. In other words, a plurality of branch channels 10172 are provided and the one end of each branch channel 10172 is in communication with the main channel 10171. The other end of the main channel 10171 and the other end of each branch channel 10172 are closed, thus rapidly and duly making liquid lead collect in the lead collecting and discharging channel 1017 and discharged out of the fuming furnace 10.

Figure 4:
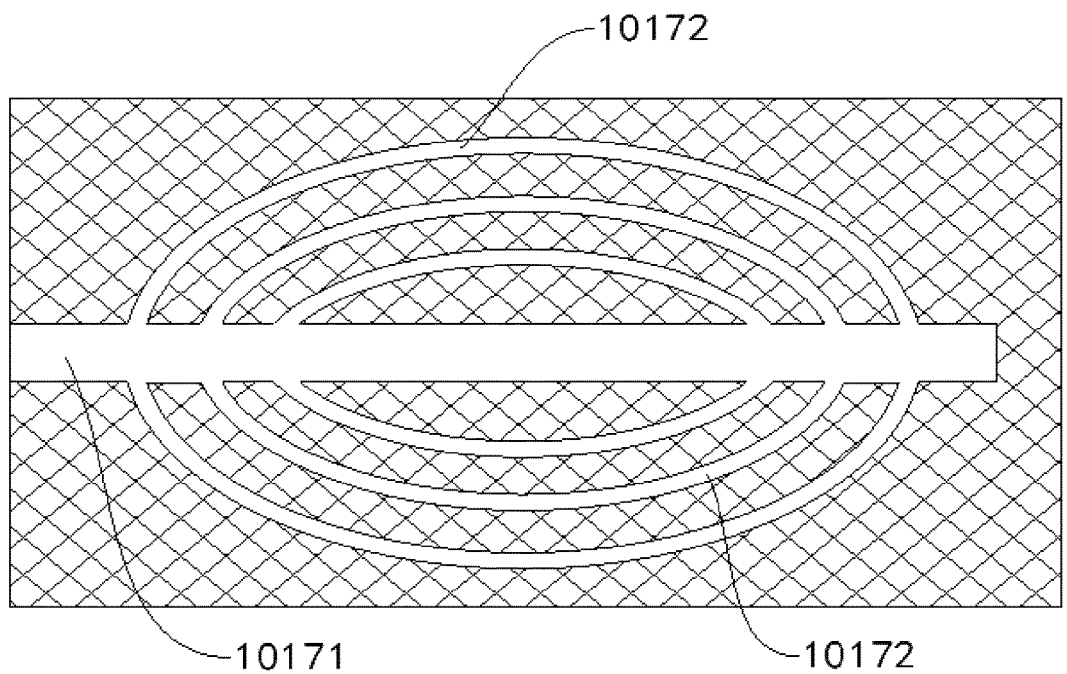
FIG. 4 is a schematic view of a lead collecting and discharging channel of a fuming furnace with a lead collecting and discharging function according to another embodiment of the present disclosure.

In another embodiment of the present disclosure, as shown in FIG. 4, the lead collecting and discharging channel 1017 includes a linear main channel 10171 and an annular branch channel 10172 in communication with the main channel 10171. Specifically, the main channel 10171 is linear. One end of the main channel 10171 is in communication with the lead discharging outlet 1018 and the other end of the main channel 10171 is closed. A plurality of branch channels 10172 are provided. Each branch channel 10172 is annular and in communication with the main channel 10171, thus rapidly and duly making liquid lead collect in the lead collecting and discharging channel 1017 and discharged out of the fuming furnace 10.

As shown in FIG. 3, the lead collecting and discharging channel 1017 includes the linear main channel 10171 and the linear branch channel 10172 in communication with the main channel 10171. Specifically, the main channel 10171 is linear. One end of the main channel 10171 is in communication with the lead discharging outlet 1018 and the one end of the main channel 10171 is closed. A plurality of branch channels 10172 are provided. Each branch channel 10172 is linear. One end of each branch channel 10172 is closed and the other end of each branch channel 10172 is in communication with the main channel 10171, thus rapidly and duly making liquid lead collect in the lead collecting and discharging channel 1017 and discharged out of the fuming furnace 10.

According to different areas and dimensions of the refractory brick layer 1016, one or two main channels 10171 may be provided and one or more branch channels 10172 may be provided.

The furnace body 101 is provided with the tuyere 1012, the slag discharging outlet 1013 and the lead discharging outlet 1018, and each of the tuyere 1012 and the slag discharging outlet 1013 runs through the hearth water jacket 1015. In an embodiment of the present disclosure, as shown in FIG. 2, a plurality of tuyeres 1012 are provided and the plurality of tuyeres 1012 are spaced apart from each other along a circumferential direction of the furnace body 101, so that the structure of the fuming furnace 10 is reasonable.

In the specification, it is to be understood that terms such as "central," "longitudinal," "lateral," "length," "width," "thickness," "upper," "lower," "front," "rear," "left," "right," "vertical," "horizontal," "top," "bottom," "inner," "outer," "clockwise," and "counterclockwise" should be construed to refer to the orientation as then described or as shown in the drawings under discussion. These relative terms are for convenience of description and do not require that the present invention be constructed or operated in a particular orientation.

In addition, terms such as "first" and "second" are used herein for purposes of description and are not intended to indicate or imply relative importance or significance or to imply the number of indicated technical features. Thus, the feature defined with "first" and "second" may comprise one or more of this feature. In the description of the present invention, "a plurality of" means two or more than two, unless specified otherwise.

In the present invention, unless specified or limited otherwise, the terms "mounted," "connected," "coupled," "fixed" and the like are used broadly, and may be, for example, fixed connections, detachable connections, or integral connections; may also be mechanical or electrical connections; may also be direct connections or indirect connections via intervening structures; may also be inner communications of two elements, which can be understood by those skilled in the art according to specific situations.

In the present invention, unless specified or limited otherwise, a structure in which a first feature is "on" or "below" a second feature may include an embodiment in which the first feature is in direct contact with the second feature, and may also include an embodiment in which the first feature and the second feature are not in direct contact with each other, but are contacted via an additional feature formed therebetween. Furthermore, a first feature "on," "above," or "on top of" a second feature may include an embodiment in which the first feature is right or obliquely "on," "above," or "on top of" the second feature, or just means that the first feature is at a height higher than that of the second feature; while a first feature "below;" "under," or "on bottom of" a second feature may include an embodiment in which the first feature is right or obliquely "below," "under," or "on bottom of" the second feature, or just means that the first feature is at a height lower than that of the second feature.

Reference throughout this specification to "an embodiment," "some embodiments," "one embodiment", "another example," "an example," "a specific example," or "some examples," means that a particular feature, structure, material, or characteristic described in connection with the embodiment or example is included in at least one embodiment or example of the present disclosure, Thus, the appearances of the phrases such as "in some embodiments," "in one embodiment", "in an embodiment", "in another example," "in an example," "in a specific example," or "in some examples," in various places throughout this specification are not necessarily referring to the same embodiment or example of the present disclosure. Furthermore, the particular features, structures, materials, or characteristics may be combined in any suitable manner in one or more embodiments or examples.

Although explanatory embodiments have been shown and described, it would be appreciated by those skilled in the art that the above embodiments cannot be construed to limit the present disclosure, and changes, alternatives, and modifications can be made in the embodiments without departing from spirit, principles and scope of the present disclosure.

What is claimed is:

1. A fuming furnace with a lead collecting and discharging function comprising: a furnace body,
   wherein the furnace body is provided with a hearth therein and a tuyere thereon, the hearth has a bottom forming a molten pool, the furnace body is provided with a slag discharging outlet and a lead discharging outlet, the furnace body comprises a furnace bottom water jacket and a hearth water jacket, the furnace bottom water jacket has an inner wall provided with a refractory brick layer, the refractory brick layer is provided with a lead collecting and discharging channel configured to collect and discharge lead therein, the lead collecting and discharging channel is in communication with the lead discharging outlet, the lead collecting and discharging channel is in communication with the molten pool through joints between refractory bricks forming the refractory brick layer, the lead collecting and discharging channel comprises one main channel and a plurality of branch channels, and the plurality of branch channels are in communication with the main channel at different positions.

2. The fuming furnace with the lead collecting and discharging function according to claim 1, wherein the lead discharging outlet is disposed at a lower portion of an end wall of the furnace body.

3. The fuming furnace with the lead collecting and discharging function according to claim 1, wherein the lead collecting and discharging channel comprises a main channel and a branch channel,
   wherein one end of the main channel is in communication with the lead discharging outlet and one end of the branch channel is in communication with the main channel, and the other end of the main channel and the other end of the branch channel are closed.

4. The fuming furnace with the lead collecting and discharging function according to claim 2, wherein the lead collecting and discharging channel comprises a main channel and a branch channel,
   wherein one end of the main channel is in communication with the lead discharging outlet and one end of the branch channel is in communication with the main channel, and the other end of the main channel and the other end of the branch channel are closed.

5. The fuming furnace with the lead collecting and discharging function according to claim 1, wherein the lead collecting and discharging channel comprises a linear main channel and an annular or linear branch channel in communication with the main channel.

6. The fuming furnace with the lead collecting and discharging function according to claim 2, wherein the lead collecting and discharging channel comprises a linear main channel and an annular or linear branch channel in communication with the main channel.

7. The fuming furnace with the lead collecting and discharging function according to claim 3, wherein the lead collecting and discharging channel comprises a linear main channel and an annular or linear branch channel in communication with the main channel.

8. The fuming furnace with the lead collecting and discharging function according to claim 4, wherein the lead collecting and discharging channel comprises a linear main channel and an annular or linear branch channel in communication with the main channel.

9. The fuming furnace with the lead collecting and discharging function according to claim 3, wherein one or two main channels are provided and one or more branch channels are provided.

10. The fuming furnace with the lead collecting and discharging function according to claim 4, wherein one or two main channels are provided and one or more branch channels are provided.

11. The fuming furnace with the lead collecting and discharging function according to claim 5, wherein one or two main channels are provided and one or more branch channels are provided.

12. The fuming furnace with the lead collecting and discharging function according to claim 6, wherein one or two main channels are provided and one or more branch channels are provided.

13. The fuming furnace with the lead collecting and discharging function according to claim 7, wherein one or two main channels are provided and one or more branch channels are provided.

14. The fuming furnace with the lead collecting and discharging function according to claim 8, wherein one or two main channels are provided and one or more branch channels are provided.

15. The fuming furnace with the lead collecting and discharging function according to claim 2, wherein a first end of the main channel is in communication with the lead discharging outlet, a second end of the main channel is closed by the refractory bricks and spaced apart from the hearth water jacket, a first end of the branch channel is in communication with the main channel, and a second end of the branch channel is closed by the refractory bricks and spaced apart from the hearth water jacket.

16. A fuming furnace with a lead collecting and discharging function comprising: a furnace body,
wherein the furnace body is provided with a hearth therein and a tuyere thereon, the hearth has a bottom forming a molten pool, the furnace body is provided with a slag discharging outlet and a lead discharging outlet, the furnace body comprises a furnace bottom water jacket and a hearth water jacket, the furnace bottom water jacket has an inner wall provided with a refractory brick layer, the refractory brick layer is provided with a lead collecting and discharging channel configured to collect and discharge lead therein, the lead collecting and discharging channel is in communication with the lead discharging outlet, the lead collecting and discharging channel is in communication with the molten pool through joints between refractory bricks forming the refractory brick layer, the lead discharging outlet is disposed at a lower portion of an end wall of the furnace body, the lead collecting and discharging channel comprises a main channel and a branch channel, a first end of the main channel is in communication with the lead discharging outlet, a second end of the main channel is closed by the refractory bricks and spaced apart from the hearth water jacket, a first end of the branch channel is in communication with the main channel, and a second end of the branch channel is closed by the refractory bricks and spaced apart from the hearth water jacket.

\* \* \* \* \*